(12) United States Patent
Stevens

(10) Patent No.: US 9,804,975 B2
(45) Date of Patent: Oct. 31, 2017

(54) HARDWARE-ENFORCED PREVENTION OF BUFFER OVERFLOW

(71) Applicant: The Johns Hopkins University, Baltimore, MD (US)

(72) Inventor: James M. Stevens, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 32 days.

(21) Appl. No.: 14/746,044

(22) Filed: Jun. 22, 2015

(65) Prior Publication Data

US 2015/0370496 A1    Dec. 24, 2015

Related U.S. Application Data

(60) Provisional application No. 62/015,611, filed on Jun. 23, 2014.

(51) Int. Cl.
*G06F 3/06* (2006.01)
*G06F 12/14* (2006.01)
*G06F 21/52* (2013.01)

(52) U.S. Cl.
CPC ......... *G06F 12/1416* (2013.01); *G06F 21/52* (2013.01); *G06F 2212/1052* (2013.01)

(58) Field of Classification Search
CPC .............. G06F 9/3004; G06F 9/30072; G06F 12/0815; G06F 9/30189; G06F 9/3861; G06F 12/145; G06F 21/62; G06F 9/3834; G06F 11/0772; G06F 12/1425; G06F 2212/652; G06F 9/4812; G06F 9/30018; G06F 12/1416; G06F 2207/7219; G06F 2212/1052; G06F 3/0619; G06F 9/3806; G06F 3/0653; G06F 3/0679
USPC .... 711/118, E12.001, 144, 145, 163, 3, 113, 711/154, 212; 710/261, 262; 712/224; 1/1
See application file for complete search history.

(56) References Cited

U.S. PATENT DOCUMENTS

| | | | |
|---|---|---|---|
| 7,512,862 B1 * | 3/2009 | Taylor | G06F 11/1076 702/189 |
| 7,634,638 B1 * | 12/2009 | Jensen | G06F 9/30018 710/262 |
| 8,024,798 B2 | 9/2011 | Moritzen | |
| 8,136,091 B2 | 3/2012 | Erlingsson et al. | |
| 8,468,592 B2 | 6/2013 | Sehr et al. | |
| 8,645,644 B2 | 2/2014 | Guthrie et al. | |
| 8,738,860 B1 * | 5/2014 | Griffin | G06F 12/0897 711/122 |

(Continued)

*Primary Examiner* — Tuan Thai
*Assistant Examiner* — Edward Waddy, Jr.
(74) *Attorney, Agent, or Firm* — Sung T. Kim

(57) ABSTRACT

An apparatus having processing circuitry configured to execute applications involving access to memory may include a CPU and a cache controller. The CPU may be configured to access cache memory for execution of an application. The cache controller may be configured to provide an interface between the CPU and the cache memory. The cache controller may include a bitmask to enable the cache controller to employ a two-level data structure to identify memory exploits using hardware. The two-level data structure may include a page level protection mechanism, and a sub-page level protection mechanism.

18 Claims, 5 Drawing Sheets

(56) References Cited

U.S. PATENT DOCUMENTS

| | | | |
|---|---|---|---|
| 2006/0294319 A1* | 12/2006 | Mansell | G06F 12/0831 |
| | | | 711/146 |
| 2007/0005935 A1* | 1/2007 | Khosravi | G06F 21/79 |
| | | | 711/216 |
| 2008/0034179 A1* | 2/2008 | Mewhinney | G06F 12/1036 |
| | | | 711/163 |
| 2008/0162829 A1 | 7/2008 | Scott et al. | |
| 2011/0137653 A1* | 6/2011 | Ljolje | G10L 15/183 |
| | | | 704/255 |
| 2012/0297146 A1* | 11/2012 | Guthrie | G06F 12/0815 |
| | | | 711/141 |
| 2013/0166834 A1* | 6/2013 | Mayhew | G06F 12/10 |
| | | | 711/105 |
| 2015/0058586 A1 | 2/2015 | Janssen et al. | |

\* cited by examiner

HARDWARE-ENFORCED PREVENTION OF BUFFER OVERFLOW

CROSS-REFERENCE TO RELATED APPLICATIONS

This application claims the benefit of U.S. Provisional Application No. 62/015,611 filed on Jun. 23, 2014, the entire contents of each which are hereby incorporated herein by reference.

TECHNICAL FIELD

Example embodiments generally relate to analysis techniques for dealing with memory corruption vulnerabilities and, in particular, relate to a technique for providing a hardware-based solution for dealing with such vulnerabilities.

BACKGROUND

Memory corruption vulnerabilities (e.g., in C/C++ programs) are a primary way attackers defeat modern cyber defenses such as anti-virus, whitelisting, and trusted computing. All large software systems generally have these bugs, including systems with extensive testing and auditing processes. Even most "memory safe" programming languages, such as Java, Python and Javascript depend on runtime environments and system libraries that are implemented in C/C++ and regularly have new memory vulnerabilities discovered in their code. New Common Vulnerabilities and Exposures (CVE) reports are created every month showing successful exploitation of these vulnerabilities.

The exploit problem is so severe that much of the current cyber defense research simply assumes system compromise via exploitation is certain to happen and instead focuses on recognizing and cleaning up the attacks after the fact with network monitoring, integrity checking, forensics, sandboxing, and automated recovery systems. This assumption arises from the current defensive strategy against exploits is a time consuming game of "whack-a-mole" to find memory vulnerabilities in commonly used software and patch the bugs one-by-one. The vulnerabilities are therefore typically not found until after a successful cyber attack has occurred. Even when the vulnerabilities are discovered ahead of time by defenders, there is still a window of opportunity for attackers in between the announcement of a patch and the deployment of the patch across the world. Thus, the current situation creates an environment in which defenders must find all vulnerabilities whereas the attacker need only find one. Thus, attackers have a distinct advantage that can even provide advanced persistent threats to nation-state resources, such as the military and defense industrial base, which are at risk for espionage and sabotage.

Accordingly, it may be desirable to continue to develop improved mechanisms for providing defense against memory vulnerability exploits. Moreover, it may be desirable to recognize the bottlenecks in the process of exploiting computer systems so that common patterns of memory corruptions in deployed systems can be recognized as soon as they happen and stopped before they can achieve arbitrary execution. Current technologies that are robust enough to identify memory corruption have too much overhead to use in deployed systems and cannot be used at runtime. Thus, it may also be desirable to provide a solution with low enough overhead to permit runtime execution.

BRIEF SUMMARY OF SOME EXAMPLES

Accordingly, some example embodiments may enable the provision of a relatively efficient solution for addressing the issues described above.

In one example embodiment, an apparatus having processing circuitry configured to execute applications involving access to memory is provided. The apparatus may include a CPU and a cache controller. The CPU may be configured to access cache memory for execution of an application. The cache controller may be configured to provide an interface between the CPU and the cache memory. The cache controller may include a bitmask to enable the cache controller to employ a two-level data structure to identify memory exploits using hardware. The two-level data structure may include a page level protection mechanism, and a sub-page level protection mechanism.

In another example embodiment, a method of providing protection for a CPU relative to accessing cache memory for execution of an application is provided. The method may include providing a bitmask at a cache controller configured to provide an interface between the CPU and the cache memory, and employing a two-level data structure to identify memory exploits using hardware. The two-level data structure may include a page level protection mechanism, and a sub-page level protection mechanism.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION

Figure 1:
FIG. 1 illustrates a 96 byte array that is protected via a concept of employing guard pages.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

In some example embodiments, a relatively low overhead solution to the problem discussed above may be offered by adding hardware support to CPUs or processing circuitry in order to enable a computer to defend itself against memory vulnerability attacks. A software-only approach to providing a memory debugging system, like the AddressSanitizer methodology provided by Google, requires performing lookups into shadow memory before every single memory access in a program to determine whether such access is legal or illegal. The overhead resulting from these numerous memory accesses is far too great to enable such a solution to be used in deployed systems and current computer hardware cannot support the algorithm directly.

Other solutions define 4096 byte guard pages that are unmapped virtual memory pages that will trigger a segmentation fault when accessed. The OpenBSD memory allocator inserts these guard pages after large allocations to protect against heap buffer overflows. Unfortunately, since these guard pages must be aligned to 4096 bytes, large amounts of memory fragmentation occur if the guard pages are used for small allocations typical in most computer programs. Thus, guard pages are not particularly useful for protection against exploits that corrupt memory.

An example embodiment, which employs a hardware-based solution, may be referred to as employing the concept of guard lines. The guard lines concept works by extending the virtual memory system to allow for fine-grained memory protection. The hardware modifications required to support the guard lines may be relatively easy to employ, and may be backwards compatible with current software. In particular, the guard lines concept involves the optional addition of a guard line mask (GLM) to each virtual memory page that uses fine-grained protection. When the CPU loads a page table entry (PTE) into the translation lookaside buffer (TLB), the CPU is configured to check a guard line mask bit (GLMB) in the PTE. If the GLMB is set, then the PTE has an associated GLM. The CPU retrieves the GLM for the current page from a GLM cache based on a location that can be found in a GLM table (GLMT). This defines an upper level (i.e., page level) protection mechanism.

The GLM may be one 64-bit machine word in length per virtual memory page. Each bit of the GLM corresponds to one 64 byte cache line in the 4096 byte page. If a guard line bit for a cache line is set, then the corresponding cache line is has been configured as a guard line. When a memory access instruction occurs, the CPU cache controller may consult the GLM in parallel with normal execution of the pipeline and if the current cache line being accessed has a guard line bit set (i.e., has been inappropriately accessed), then the CPU may be configured to raise a guard line exception to indicate that a memory corruption has been detected. Setting the GLMs may be the responsibility of the compiler and the runtime environment. The assumption made is that it is easier to ensure that the compiler and the C library correctly set the GLMs than it is to assume that all application software in the system is free of memory vulnerabilities.

An advantage of employing the guard lines concept during deployment is that providing the protective functions described herein with hardware support will provide the necessary efficiency to protect systems at runtime. However, this advantage can also be appreciated as raising the difficulty level associated with building such a system. In an example embodiment, a quick emulator (QEMU) may be used to implement the guard lines concept in hardware. As such, instruction set architecture extensions for guard lines hardware may be designed with a QEMU x86-64 code generation engine. Implementation of modifications may then be undertaken to the GNU C library for heap protection support, and the compiler (either GCC or LLVM) for stack protection support. For heap buffer overflow protection, a guard line may be added after each memory allocation on a malloc( ) call. For heap use-after-free protection, guard lines may be applied to memory regions passed to free( ). For stack buffer overflow protection, the compiler may be modified to replace the current stack canaries with a guard line. Accordingly, since stack canaries cannot detect buffer overread errors (like Heartbleed) and are vulnerable to information disclosure bugs that leak the canary value, the use of guard lines instead of stack canaries may represent an improvement. Guard line stack protection may be safe against these buffer overread errors and information disclosure bugs.

Although a QEMU can be used to emulate guard lines hardware, it should be appreciated that hardware employing the guard lines concept directly (i.e., without emulation) may also be produced. For example, in one sample implementation, a reserved bit in the PTE may be utilized as the GLMB. If the GLMB is set, then the TLB will know to read in a GLM from the GLMT after reading the PTE from the page table while servicing a TLB miss. The GLMT will contain an entry for all virtual memory pages that are marked with the GLMB. The CPU cache will then use the GLM to verify that all memory accesses do not access a guard line. This check can be done in parallel with the memory access and will be enforced when a memory access instruction is committed at the reorder buffer pipeline stage. If a guard line access is detected, then a guard line exception will be raised to indicate to the operating system that a program is not well-behaved. For pages that do not have the GLMB set, this design creates zero overhead because no extra read into the GLMT is necessary. Evaluations of the guard lines concept, illustrate that hardware employing the guard lines concept performs with the necessary efficiency to be used at runtime.

A general illustration of the concept of guard lines will now be explained in reference to FIGS. 1-4 below. In this regard, FIG. 1 illustrates a 96-byte array example employing guard pages. However, it should be appreciated that other sized arrays could be employed in other embodiments. As mentioned above, guard pages have 4000 bytes of physical overhead. An array 100 includes a data portion 110 having 96 bytes. When employing protection with guard pages, the array 100 may further include a padding portion 120 of 4000 bytes and a guard page 130 defined in virtual memory that includes 4096 bytes. Thus, the example of FIG. 1 employs protection at the page level, and can be seen to require a large amount of physical overhead.

Figure 2:
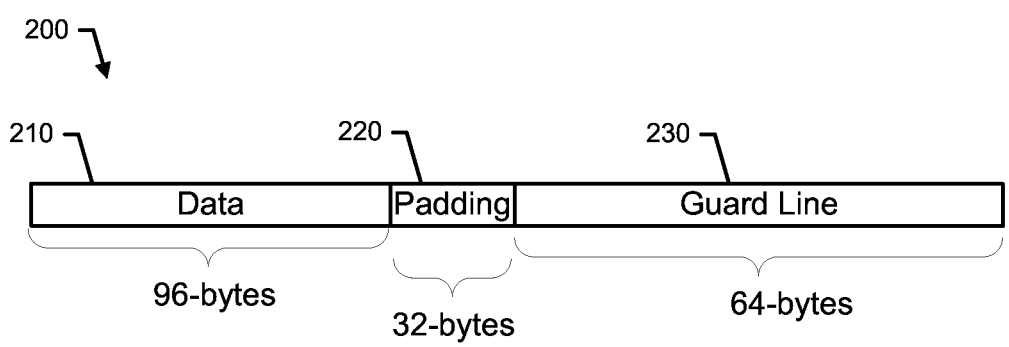
FIG. 2 illustrates the employment of guard lines for addressing memory vulnerabilities according to an example embodiment.

Meanwhile, an example employing guard lines (instead of guard pages) is shown in reference to FIG. 2. As shown in FIG. 2, for an array 200 that includes a 96-byte data portion 210, the padding portion 220 may include 32 bytes and only a 64 byte guard line portion 230 may be required. As can be appreciated from FIG. 2, the protection provided by the guard line portion 230 can be achieved with a much lower amount of physical overhead.

As can be appreciated from the discussion above, the guard line concept extends the virtual memory system to create "guard lines" that are a 64-byte region of memory that well-behaved applications should never access. If a guard line is accessed, a program has been corrupted and execution of the program should cease. Guard lines can be placed in between vital data structures on the stack and the heap by compilers, libraries or programmers to prevent exploits leveraging buffer overflow errors. Use-after-free exploits can also be prevented by having the C library set guard lines for recently freed heap data for a period of time.

To implement hardware support for guard lines, the virtual memory's PTE is extended with the GLMB. If the GLMB is set, then the PTE has an associated GLM. For a typical architecture with 64-byte cache lines per page, each GLM will be 8 bytes. On a TLB miss, the PTE is loaded and the GLMB is inspected. If the GLMB was set, then the TLB hardware also must load the GLM into the CPU. On every access to the CPU cache, the accessed cache line's guard bit in the GLM is checked. If the guard bit is set, then a CPU exception is raised to tell the operating system of the violation.

Since not all PTEs in the TLB will have an associated GLM, a separate GLM cache (GLMC) may be implemented to store GLMs. This will allow the CPU designer to determine an appropriate ratio between TLB size and GLMC size, based on the estimated needs of software. When a PTE is evicted from the TLB, the associated GLM must also be evicted from the GLMC.

Guard lines also require changes to the instructional set architecture (ISA) of the CPU. A pointer to the secondary table that holds the GLMs for a process may be stored in a GLMT register. The operating system may be responsible for allocating the GLMT for each protected process and for setting the GLMT register on a context switch. To set guard lines, a set of instructions may be added to the ISA that take a GLM and a virtual page number. For example, GLM_OR and GLM_AND instructions may be sufficient to efficiently manipulate the GLM for a page. GLMs may be dynamically created on demand by the hardware and dynamically destroyed when the TLB evicts a PTE with the GLMB set, but with an empty GLM. If necessary, the operating system can intervene to allocate more space to the GLMT.

Figure 3:
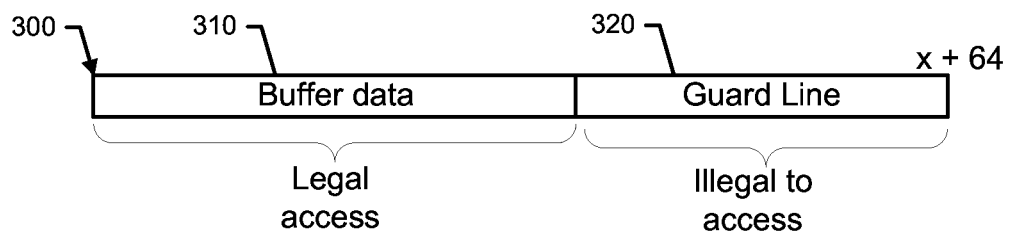
FIG. 3 illustrates a possible structure for the employment of guard lines in accordance with an example embodiment.

Referring now to FIG. 3, a layout for guard line memory is displayed in accordance with an example embodiment. A buffer pointer 300 may be provided prior to the buffer data 310, which is generally legal to access. Meanwhile, a guard line 320 is also provided that is illegal to access. As mentioned above. The guard line 320 may define a 64-byte granularity guard, or region of memory that should never be accessed by well behaved programs. Detection of illegal accesses can therefore be accomplished with relatively low overhead. The 64-byte region formed as the guard line 320 may, in some examples, be unusable to the program and that memory space could be considered to be lost as overhead. For programs that use guard lines on a large scale, the amount of lost memory space may be considered non-trivial. Accordingly, to avoid loss of all of that memory space, it may be possible to use part of the guard line 320 as metadata. In such an example, guards with even finer granularity can be specified without using any additional memory. Thus, for example, the amount of padding overhead needed to use guard lines can be reduced.

Figure 4:
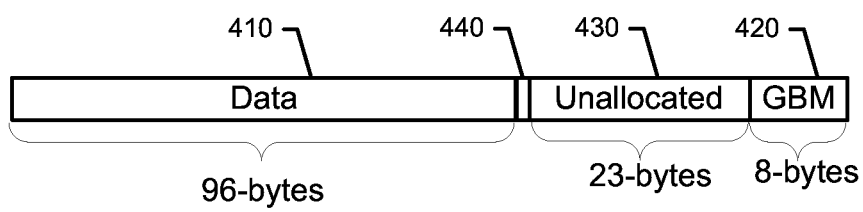
FIG. 4 illustrates byte level guard lines that may be employed in accordance with an example embodiment.

FIG. 4 shows guard line concept application at the byte-level, where padding overhead reduction can be essentially achieved. In the example of FIG. 4, it can be appreciated that there are only 9 bytes of physical overhead. In this regard, a data portion 410 including 96-bytes is provided. Meanwhile, the last 8 bytes of the guard line may be designated as a guard byte mask (GBM) 420. If a program ever accesses the GBM 420, then a guard line exception is always raised. However, for the first 56 bytes of a guard line, the GBM determines whether or not the guard line exception should be raised. Since 56 guard bytes only need 7 bytes of metadata, the last byte may be reserved for other uses. Potential applications for the last byte may include specifying read/write permissions for the guard bytes or specifying handler numbers for the operating system or application to use to redirect the guard line exception.

The hardware implementation of the extension may be implemented, as discussed above, by employing the GLMB that is consulted on each TLB miss so that the GLM is consulted upon each cache line access. If the GLM for the accessed cache line is set, then that corresponding line is a guard line. In the example discussed above, the hardware would immediately trigger a guard line exception to tell the operating system about the violation if the guard bit is set when the GLM is accessed. However, in an extension version of FIG. 4, the hardware may read the GBM from the last 8 bytes of the cache line to determine if the specific byte address accessed was illegal. The hardware will also have to take into account access width and raise the guard line exception if any of the bytes within an access are set as guard bytes. Similar to the GLM discussion above, the compiler and run-time libraries may be modified to set the GBM. Thus, for example, additional instructions such as GBM_AND and GBM_OR need to be added to the instruction set of the machine to allow the software to specify which bytes are set. In an example embodiment, as shown in FIG. 4, the 32-bytes of physical overhead may be divided between 23 unallocated bytes 430, a 1 byte guard 440 and the 8 byte GBM 420. The unallocated bytes 430 may be reused for other variables by the compiler.

Example embodiments may provide for an extension of the virtual memory system of a CPU to support guard lines. Guard lines may enable memory protection at subpage granularities to enable the compiler and run-time system to use guards pervasively throughout a program to protect all heap allocations and key stack allocations. Example embodiments may therefore define a two-level data structure in which the upper level includes a page level protection mechanism, and the lower level provides sub-page level protection. The upper level may include a page broken into cache lines (e.g., 64 byte cache lines) for a large number of pages. One bit may be designated as the GLMB for each cache line to indicate, when set, that the GLM should be retrieved to check if the guard bit has been set. The lower level may include sub-page protection based on checking individual guard lines. For a given guard line, a GBM may be provided in the last 8 bytes thereof. The first 56 bytes may be turned on or off as guards. This two level structure may enable efficient monitoring with minimal metadata, by enabling instructions to set guards with minimal memory allocations. Internal pipeline operations and protection checks may therefore be run in parallel, via a hardware solution, without excessive overhead. This may enable the CPU to monitor memory accesses during runtime operation to check the guard at any accessed location. If touched, the CPU can raise an exception and execution of the corrupted program can be avoided.

Figure 5:
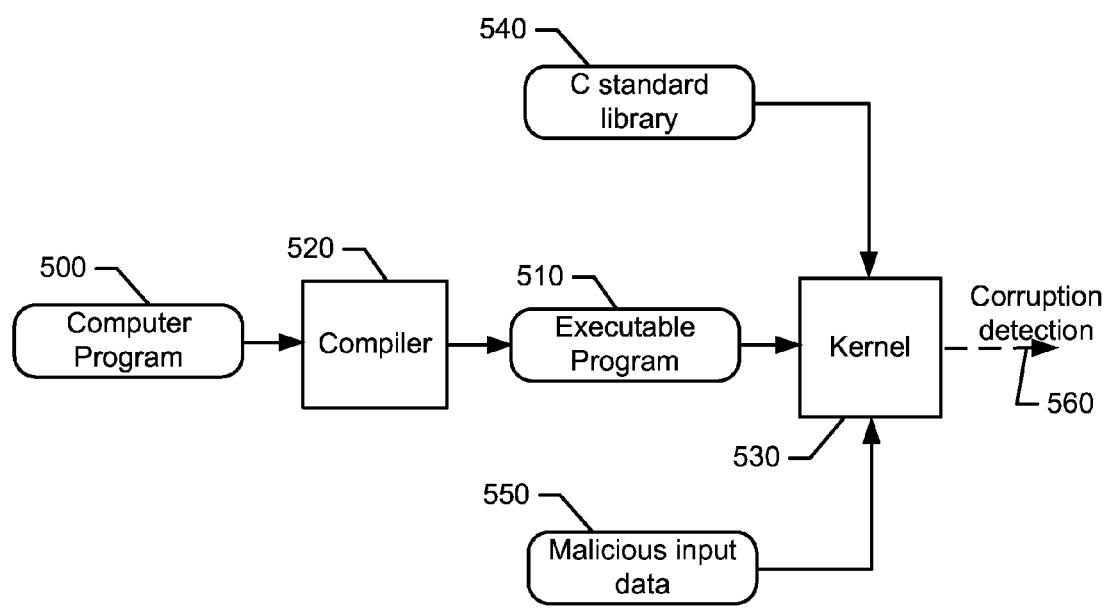
FIG. 5 illustrates a block diagram showing operation of a system in accordance with an example embodiment.

FIG. 5 illustrates a block diagram showing operation of a system in accordance with an example embodiment. As shown in FIG. 5, the system may include a computer program 500 that may transformed into an executable program 510 by a compiler 520. The computer program 500 may be a vulnerable C/C++ program, and the compiler 520 may be configured to transform the source code of the computer program 500 from the source language into object code or some other target language to generate the executable program 510. The compiler 520 may be configured to support guard lines as described herein. Thus, when the compiler 520 generates the executable program 510, the executable program 510 can be appreciated to have stack protection.

The system also includes a kernel 530, which manages input/output requests from software and translates such requests into data processing instructions for the CPU and other components of the computer. The kernel 530 is therefore an interface between applications to be executed and the CPU, memory or other computer hardware. A C standard library 540 may be operably coupled to the kernel 530 to provide macros, type definitions and functions for various tasks to be performed by the kernel 530. The C standard library 540 may have heap protection.

If malicious input data 550 is attempted to be introduced at the kernel 530 and the malicious input data 550 results in any illegal memory accesses, the guard lines technique described herein may enable memory corruption detection 560. Accordingly, zero-day exploits of software mistakes that are hard to identify or patch may be efficiently detected.

Figure 6:
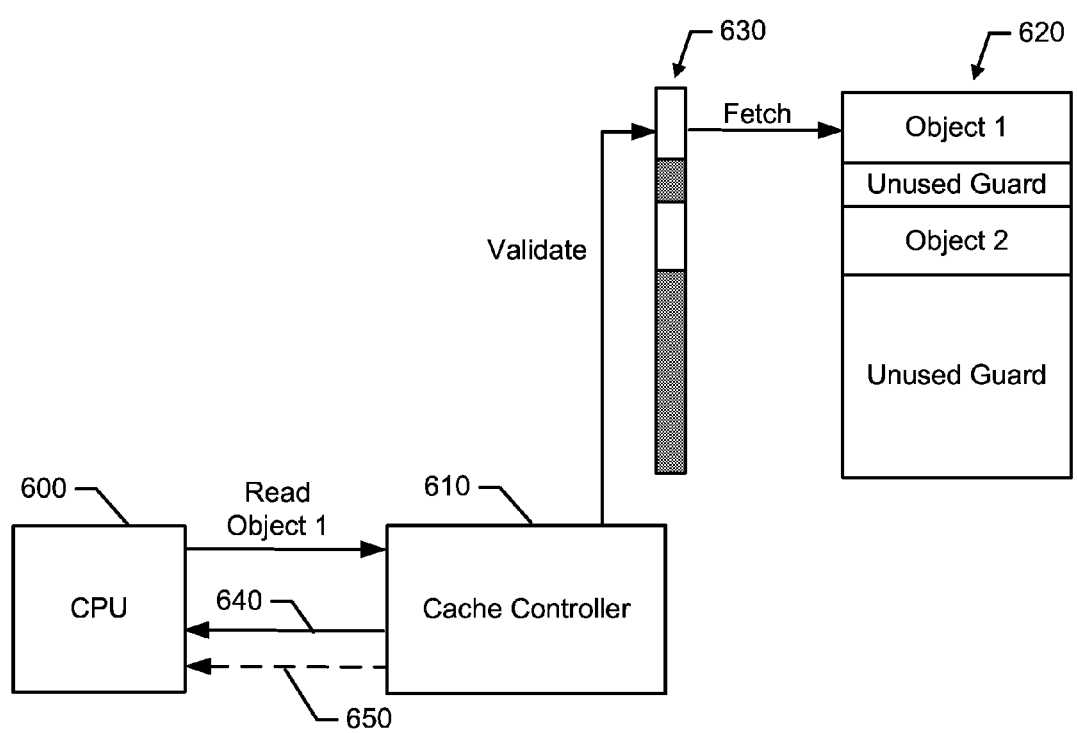
FIG. 6 illustrates a block diagram illustrating control flow associated with one example embodiment.

FIG. 6 illustrates a block diagram illustrating control flow associated with one example embodiment. As shown in FIG. 6, the CPU 600 may send an instruction to read Object 1 to a cache controller 610. The cache controller 610 may then conduct pipeline operations to fetch the Object 1 in parallel with validating the protection of guard lines associated with the memory page 620 containing the Object 1 by referencing the protection mask 630 to determine if illegal memory access has occurred. If no illegal memory access has occurred, then a result may be returned as shown by arrow 640 after fetching and validation. However, if illegal memory access has occurred, then the validation will not be completed, and a fault may be indicated as shown by arrow 650.

Example embodiments may therefore improve efficiency of runtime memory protection checks for exploit detection that are currently either too coarse-grained (e.g., guard pages) or require significant software overhead. Example embodiments therefore require significantly less metadata and simpler hardware for effective implementation, and also reduce padding requirements. The compiler and runtime system will insert guard lines between variables and buffers so that buffer overflows will touch the guard as soon as it goes outside legal range. Use after free is detected by setting guards on freed memory. These improvements may be accomplished using a two-level data structure to identify memory exploits using hardware as described herein. Moreover, as discussed, the two-level data structure may include a page level protection mechanism and a sub-page level protection mechanism. In some cases, this two-level data structure may be implemented to cause two read operations to be conducted (e.g., one for the PTE and one for the GLM). However, in an alternative embodiment, it may be possible to read the PTE and GLM in the same read operation (e.g., by assuming the GLMB is always set). In such an example, rather than using a separate guard line mask table pointer register and guard line mask cache (as described above), the guard line masks may be embedded directly into the page table to enable the page table entry and the guard line mask for that page to be read in the same DDR memory access. Thus, for example, the page table layout may be: PTE0, GLM0, PTE1, GLM1, . . . . In this alternative structure, each of the objects may be 8 bytes in size. By assuming that all pages in the system have a GLM, or by assuming a higher level in the page table data structure has the equivalent of a GLMB, the number of read operations can be reduced.

Figure 7:
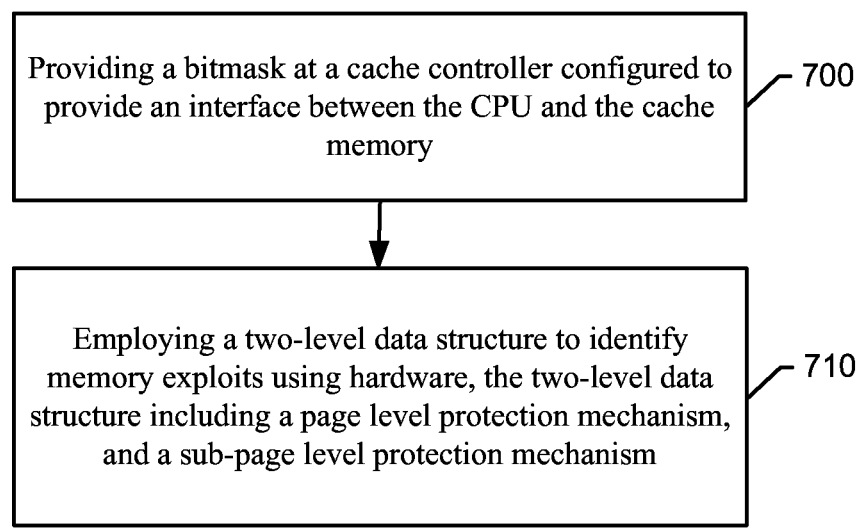
FIG. 7 illustrates a method of providing protection for a CPU relative to accessing cache memory for execution of an application according to an example embodiment.

From a technical perspective, the operating system, compiler, cache controller and other components described above may be modified as described herein to support some or all of the operations described above. As such, the platform described in FIGS. 5 and 6 may be used to facilitate the implementation of several computer based interactions that improve the functioning and efficiency of the computer. As an example, FIG. 7 is a flowchart of a method and program product according to an example embodiment. It will be understood that each block of the flowchart, and combinations of blocks in the flowchart, may be implemented by various means, such as hardware, firmware, processor, circuitry and/or other device associated with execution of the instructions and/or operations described herein. For example, one or more of the procedures described may be embodied by computer program instructions. These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of providing protection for a CPU relative to accessing cache memory for execution of an application is provided. The method may include providing a bitmask at a cache controller configured to provide an interface between the CPU and the cache memory at operation 700, and employing a two-level data structure to identify memory exploits using hardware at operation 710. The two-level data structure may include a page level protection mechanism, and a sub-page level protection mechanism.

In an example embodiment, an apparatus for performing the method of FIG. 7 above may comprise a processor or processing circuitry configured to perform some or each of the operations (700-710) described above. The processor may, for example, be configured to perform the operations (700-710) by performing hardware implemented logical functions, executing stored instructions, or executing algorithms for performing each of the operations. In some embodiments, the processor or processing circuitry may be further configured for additional operations or optional modifications to operations 700 to 710. In this regard, for example, the method may further include the page level protection mechanism may include designating a selected number (e.g., 64 bytes) of bits corresponding to each cache line as guard lines that, if accessed, indicate a protection fault. In an example embodiment, the page level protection mechanism may further include designating one bit per page as a guard line mask bit to indicate whether the bitmask is to be inspected responsive to accessing the cache memory. In some cases, in response the guard line mask bit being set, the bitmask is retrieved to check a guard bit of the bitmask to determine if a guard line has been accessed. In an example embodiment, the sub-page level protection mechanism may include providing a guard bit in the bitmask where the guard bit indicates whether a guard line has been accessed to indicate a protection fault. In some cases, the bitmask is loaded into the CPU responsive to a guard line mask bit being set for a page to enable the bitmask to be inspected to determine whether the guard bit is set. In an example embodiment, the bitmask is stored in a guard line mask cache, and a register is provided to store a table having pointers to the bitmask and a plurality of other bitmasks. In some cases, the sub-page level protection mechanism comprises a guard byte mask provided as the last 8 bytes of a guard line. In such an example, 56 bytes of the guard line preceding the guard byte mask may be enabled to be turned on or off as guards. In an example embodiment, the bitmask may be enabled to be dynamically created on demand by the hardware and dynamically destroyed.

In the context described herein, "page" means the 4 kilobyte region of memory including sixty-four 64 byte cache lines, "cache line" is the 64-byte region of memory including sixty-four bytes, and each page has a GLMB associated with it in its page table entry. For pages with a GLM, each bit in the GLM corresponds to a cache line. Each cache line with the corresponding bit set in the GLM is a guard line. Each guard line may be illegal to access completely (e.g., for coarse-grained protection) or may have the guard byte mask to consult (e.g., for fine-grained protection).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus comprising processing circuitry configured to execute applications involving access to memory, the apparatus comprising:
   a CPU configured to access cache memory comprising a plurality of cache lines for execution of an application; and
   a cache controller configured to provide an interface between the CPU and the cache memory, the cache controller comprising a bitmask to enable the cache controller to employ a two-level data structure including a page level protection mechanism and a sub-page level protection mechanism in parallel to identify memory exploits using hardware,
   wherein the page level protection mechanism comprises designating a selected number of bits corresponding to each cache line as a guard line that, if accessed, indicate a protection fault, and
   wherein at least a portion of at least one guard line is used to store metadata.

2. The apparatus of claim 1, wherein the page level protection mechanism further comprises designating one bit per page as a guard line mask bit to indicate whether the bitmask is to be inspected responsive to accessing the cache memory.

3. The apparatus of claim 2, wherein, in response the guard line mask bit being set, the bitmask is retrieved to check a guard bit of the bitmask to determine if a guard line has been accessed.

4. The apparatus of claim 1, wherein the sub-page level protection mechanism comprises providing a guard bit in the bitmask, the guard bit indicating whether a guard line has been accessed to indicate a protection fault.

5. The apparatus of claim 4, wherein the bitmask is loaded into the CPU responsive to a guard line mask bit being set for a page to enable the bitmask to be inspected to determine whether the guard bit is set.

6. The apparatus of claim 1, wherein the bitmask is stored in a guard line mask cache, and wherein a register is provided to store a table having pointers to the bitmask and a plurality of other bitmasks.

7. The apparatus of claim 1, wherein the sub-page level protection mechanism comprises a guard byte mask provided as a last 8 bytes of a guard line.

8. The apparatus of claim 7, wherein 56 bytes of the guard line preceding the guard byte mask are enabled to be turned on or off as guards.

9. The apparatus of claim 1, wherein the bitmask is enabled to be dynamically created on demand by the hardware and dynamically destroyed.

10. A method of providing protection for a CPU relative to accessing cache memory comprising a plurality of cache lines for execution of an application, the method comprising:
    providing a bitmask at a cache controller configured to provide an interface between the CPU and the cache memory; and
    employing a two-level data structure including a page level protection mechanism and a sub-page level protection mechanism in parallel to identify memory exploits,
    wherein the page level protection mechanism comprises designating a selected number of bits corresponding to each cache line as a guard line that, if accessed, indicate a protection fault, and
    wherein at least a portion of at least one guard line is used to store metadata.

11. The method of claim 10, wherein the page level protection mechanism further comprises designating one bit per page as a guard line mask bit to indicate whether the bitmask is to be inspected responsive to accessing the cache memory.

12. The method of claim 11, wherein, in response the guard line mask bit being set, the bitmask is retrieved to check a guard bit of the bitmask to determine if a guard line has been accessed.

13. The method of claim 10, wherein the sub-page level protection mechanism comprises providing a guard bit in the bitmask, the guard bit indicating whether a guard line has been accessed to indicate a protection fault.

14. The method of claim 13, wherein the bitmask is loaded into the CPU responsive to a guard line mask bit being set for a page to enable the bitmask to be inspected to determine whether the guard bit is set.

15. The method of claim 10, wherein the bitmask is stored in a guard line mask cache, and wherein a register is provided to store a table having pointers to the bitmask and a plurality of other bitmasks.

16. The method of claim 10, wherein the sub-page level protection mechanism comprises a guard byte mask provided as a last 8 bytes of a guard line.

17. The method of claim 16, wherein 56 bytes of the guard line preceding the guard byte mask are enabled to be turned on or off as guards.

18. The method of claim 10, wherein the bitmask is enabled to be dynamically created on demand by the hardware and dynamically destroyed.

* * * * *